T. G. SPRINGER.
Manufacture of Illuminating Gas from Oil-Vapor, Hydrogen, and Air.

No. 134,109.

2 Sheets--Sheet 1.

Patented Dec. 17, 1872.

Witness:
Jas. E. Hutchinson
C. L. Evert.

Inventor.
Theodore G. Springer
per Alexander Mason
Attorneys

2 Sheets--Sheet 2.

T. G. SPRINGER.

Manufacture of Illuminating Gas from Oil-Vapor, Hydrogen, and Air.

No. 134,109.                                   Patented Dec. 17, 1872.

Witness:
Jas. E. Hutchinson
C. L. Evert

Inventor.
Theodore G. Springer,
per Alexander Mason
Attorneys.

UNITED STATES PATENT OFFICE.

THEODORE G. SPRINGER, OF NEW YORK, N. Y.

IMPROVEMENT IN THE MANUFACTURE OF ILLUMINATING-GAS FROM OIL-VAPOR, HYDROGEN, AND AIR.

Specification forming part of Letters Patent No. 134,109, dated December 17, 1872.

*To all whom it may concern:*

Be it known that I, THEODORE G. SPRINGER, of New York, in the county of New York and in the State of New York, have invented certain new and useful Improvements in Gas-Machines; and do hereby declare that the following is a full, clear, and exact description thereof, reference being had to the accompanying drawing and to the letters of reference marked thereon making a part of this specification.

My invention relates to that class of gas-machines in which hydrogen and atmospheric air are mixed and then passed through hydrocarbon liquid to form an illuminating-gas; and it consists in the use of a single sliding valve for both the inlet of the hydrogen and outlet of the mixed hydrogen and air, the same having been mixed within said valve. It also consists in the construction and arrangement of said valve and the mechanism for instantaneously operating the same. My invention further consists in the construction and arrangement of the apparatus for producing the hydrogen, all of which will be hereinafter more fully set forth.

In order to enable others skilled in the art to which my invention appertains to make and use the same, I will now proceed to describe its construction and operation, referring to the annexed drawing, in which—

Figure 1:
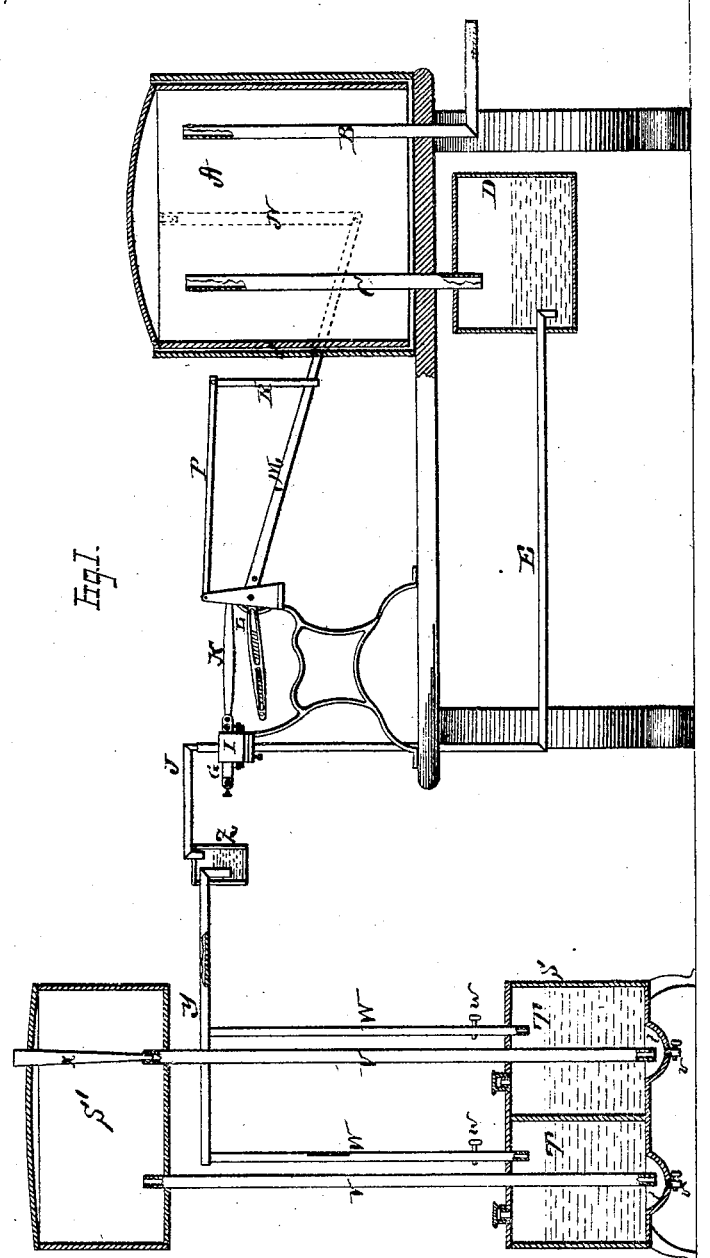
Figure 2:
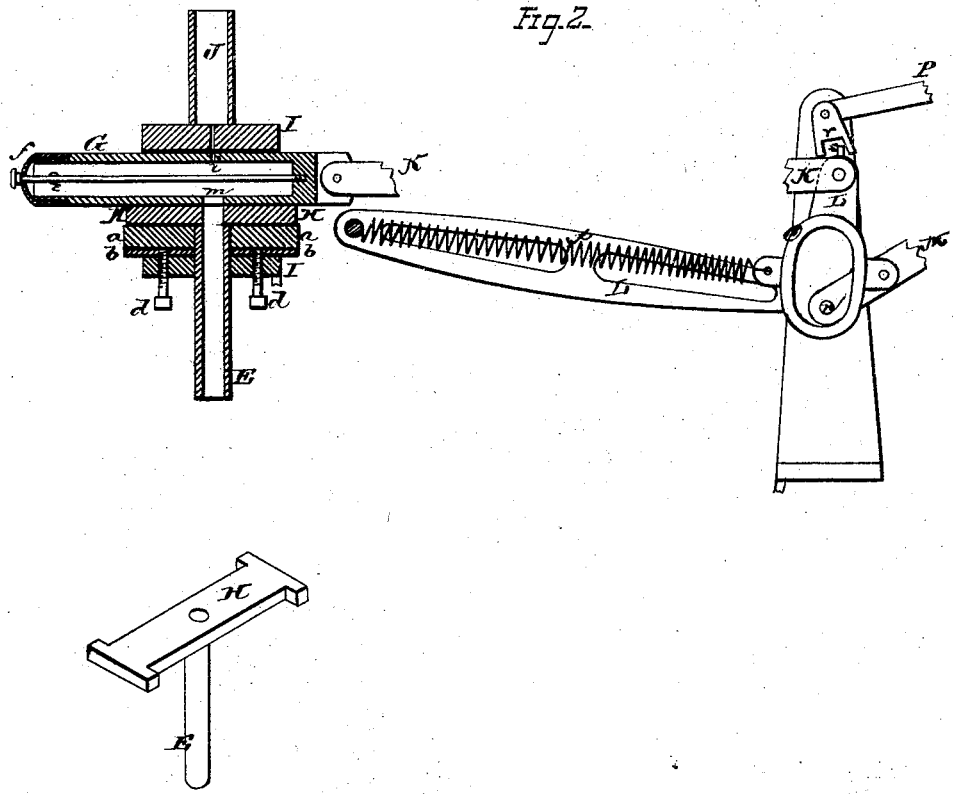

Figure 1 is a longitudinal vertical section of a gas-machine, showing my improvements on the same; and Fig. 2 is an enlarged section of the valve with its operating mechanism.

A represents the gas-holder with outlet-pipe B leading to the burners. C is the inlet-pipe leading to the holder A from the tank D, in which the hydrocarbon liquid is placed. E is the pipe conducting the mixed hydrogen and air into the oil in the tank D. The other end of this pipe is attached to a plate, H, which is capable of moving up and down in a box or casing, I, that forms the valve-seat for the valve G. This valve slides back and forth in the seat I, its ends projecting on both sides of the same, as shown in Fig. 2. Between the plate H and the bottom of the box or casing I is placed a rubber block or spring, $a$, with a metal plate, $b$, underneath and set-screws $d\ d$ passing through the bottom of the box, against the under side of said plate $b$. The rubber spring forces the plate H and valve G upward, making the latter tight in its place, and compensating for any ordinary wear of the valve and seat; when so much worn that the rubber spring will not properly perform its function, by screwing up the set-screws $d\ d$ the defect is at once remedied. One end of the valve G is open and a cap, $f$, placed over said end. In the side of this cap are suitable openings $e$, corresponding with similar openings in the side of the valve, so that by turning the cap more or less air may be admitted into the valve, the cap thus answering for a register. J is the pipe conducting the hydrogen to the valve, the hydrogen passing through a small orifice, $i$, into the same, the valve G being hollow from one end inward for a suitable distance. Directly opposite the orifice $i$ is an opening, $m$, in the valve corresponding with the outlet-pipe E. The hydrogen passing into the valve, under pressure, creates a suction in the same, causing the air to enter through the register $f$, and, becoming mixed with the hydrogen, it passes through the pipe E (which should, preferably, be made flexible) to the tank D, where it passes through the hydrocarbon fluid, and thence, as illuminating-gas, into the holder A.

When the valve G is moved both the inlet and outlet are closed, and the supply of hydrogen is cut off, as well as the supply of mixed air and hydrogen. This single sliding valve thus answers a variety of purposes. It, as just mentioned, shuts off the hydrogen, hence preventing any further admixture of the same with air; and it also forms the mixing tube or chamber in which the hydrogen and air are mixed together.

The position of the inlet and outlet opposite to each other and at the side of the sliding valve is also of very great importance. Heretofore the inlet of the hydrogen or carbureted hydrogen has always been at the end of valve; or, in other words, the valve has always been moved so as to stop up the hole; and, as in all instantaneous movements, there is always some dead point or points where the mechanism employed has no force, the result has been that the valve has become partially opened, the hydrogen being fed under pressure and admitted hydrogen, but not enough to create the suction required to draw in the air; and hence the machines have stopped.

With my improvement this is impossible, as the pressure of the hydrogen is on the side of the valve, and not in the direction of its movement.

The solid end of the valve G is, by a pivoted bar, K, connected with an L-shaped lever, L, which is pivoted at its angle to suitable standards. On the same pin or bolt $n$ which pivots the lever L is pivoted one end of another lever, M, the other end of which is, by a bar, N, connected with the outer side of the gas-holder A, so that as the holder rises or falls this end of the lever M will rise and fall at the same time. At the outer end of the long arm of the L-shaped lever L is attached a spiral spring, $p$, the other end of which is attached to an oval ring or slotted plate, O, and this ring or plate is pivoted to the lever M, as shown.

As the holder A is being filled with gas it rises, carrying with it the outer end of the lever M, which, at a certain point, becomes on a line with the long arm of the lever L, and as soon as the lever M has passed beyond this point the action of the spring $p$ and plate O throws the said arm of the lever L upward and through the shorter arm of said lever and the connecting-bar K instantaneously moves the valve G so as to shut off the supply of hydrogen, as above mentioned. Then, as the gas is burned at the burners the holder A descends, carrying with it the lever M, and this, after passing the (now changed) point where it comes in line with the lever L, causes, in the same manner, the valve to open and the process of mixing and supplying hydrogen and air to commence anew.

To obviate any danger that might arise from any injury to the spring $p$, I pivot a lever, P, above the end of the arm K, and at the outer end of this lever is attached a slotted bar, R, through which the lever M passes. At the pivot end of the lever P is a downward-projecting fork, $r$, and on the end of the bar or arm K is a lug, $s$, projecting upward into said fork. The slot in the bar R is of such length that the lever M, as it passes (either in going up or down) the point where it is on a line with the lever L, it will be at the end of said slot and strike the bar, thus raising or lowering, as the case may be, the lever P, so that the fork $r$, striking the lug $s$, will move the valve G. Thus, even if the spring $p$ should break or otherwise become injured, the valve will be operated at the proper time and in the proper manner.

The hydrogen admitted into the valve G is produced and fed by the following apparatus: S is a tank, of suitable dimensions, divided by a central vertical partition into two chambers, T T. In the center of the bottom of each chamber T is a depression, $t$, with stop-cock $v$. S' is another tank, of the same dimensions, and elevated a suitable distance above the tank S. From this upper tank S' a pipe, V, passes vertically down into each chamber T, the lower end going down into the depression $t$. Each chamber T has a pipe, W, with stop-cock $w$ leading into a pipe, Y, and this pipe leads into a small tank, Z. From this tank the pipe J leads to the valve G. The chambers T T are both partially filled with iron scraps or tailings, and the tank S' is filled with diluted acid water. One of the pipes V is stopped at its upper end by a plug, $x$, allowing the acid water to pass only into one of the chambers T, and, there acting on the iron, produces hydrogen, which passes up through the pipes W Y (the stop-cock $w$ in the other pipe W being closed) and into the tank Z. This tank being partially filled with lime or other suitable material to purify the hydrogen, the hydrogen in its pure state will pass into the valve through the pipe J. The weight of the column of water in the pipe V creates the desired pressure on the hydrogen according to the size of such column.

The advantage of the two-chambered tank S is as follows: When one of the chambers has received its quantity of acid water the entire strength of the same will be utilized, and not, as in other machines, a certain portion be wasted; then, when all the strength has been used by the water coming in contact with the iron, the plug $x$ is removed from the other pipe and inserted in this, and the stop-cocks $w\ w$ reversed. The process is then continued in the second chamber T while the water in the first chamber is drawn off through the stop-cock $v$, and so on. The tank S' may be replenished at leisure.

Having thus fully described my invention, what I claim as new, and desire to secure by Letters Patent, is—

1. In a gas-machine where hydrogen and atmospheric air are mixed together, creating a suction for taking in the atmospheric air by means of compressed hydrogen, substantially as herein set forth.

2. A single sliding valve for operating both the inlet and outlet, and to form the mixing-chamber for the hydrogen and atmospheric air, substantially as herein set forth.

3. In a gas-machine where hydrogen and atmospheric air are mixed together, mixing the said constituents in the valve which opens and shuts off the inlet for the hydrogen, substantially as herein set forth.

4. The arrangement of the inlet J and outlet E on the side of the sliding valve and not on a line with the direction of its movement, substantially as and for the purposes herein set forth.

5. The valve G, constructed as described, with register $f$ and passages $i\ m$, substantially as and for the purposes herein set forth.

6. The combination of the box or casing I, sliding valve G, plate H with pipe E, rubber spring $a$, plate $b$, and set-screws $d\ d$, all substantially as and for the purposes herein set forth.

7. The combination, with the sliding valve G and gas-holder A, of the bar K, levers L M, spring $p$, and ring or plate O, all constructed and arranged substantially as and for the purposes herein set forth.

8. In combination with the above device for operating the valve G, the slotted bar R, lever P with fork $r$, and the lug $s$ on the bar K, substantially as and for the purposes herein set forth.

9. The combination of the two chambered tank S with depressions $t\ t$, the tank S', pipes V W Y, and purifier Z, all substantially as and for the purposes herein set forth.

In testimony that I claim the foregoing I have hereunto set my hand this 16th day of September, 1872.

T. G. SPRINGER.

Witnesses:
   C. L. EVERT,
   J. M. MASON.